(12) United States Patent
LeCostaouec et al.

(10) Patent No.: US 11,649,191 B2
(45) Date of Patent: May 16, 2023

(54) FABRICATION OF HIGH HEAT CAPACITY CERAMIC MATRIX COMPOSITE AIRCRAFT BRAKES USING SPARK PLASMA SINTERING

(71) Applicant: GOODRICH CORPORATION, Charlotte, NC (US)

(72) Inventors: Jean-Francois LeCostaouec, Simsbury, CT (US); Iwona Wrobel, Manchester, CT (US)

(73) Assignee: Goodrich Corporation, Charlotte, NC (US)

( * ) Notice: Subject to any disclaimer, the term of this patent is extended or adjusted under 35 U.S.C. 154(b) by 636 days.

(21) Appl. No.: 16/595,746

(22) Filed: Oct. 8, 2019

(65) Prior Publication Data

US 2021/0101842 A1 Apr. 8, 2021

(51) Int. Cl.
*C04B 35/00* (2006.01)
*C04B 35/63* (2006.01)
(Continued)

(52) U.S. Cl.
CPC ........ *C04B 35/6303* (2013.01); *C04B 35/563* (2013.01); *C04B 35/63416* (2013.01); *C04B 35/645* (2013.01); *C04B 35/80* (2013.01); *C04B 41/009* (2013.01); *C04B 41/4531* (2013.01); *C04B 41/5059* (2013.01); *F16D 65/125* (2013.01); *B64C 25/42* (2013.01); *C04B 2235/3217* (2013.01); *C04B 2235/3225* (2013.01); *C04B 2235/5248* (2013.01); *C04B 2235/612* (2013.01); *C04B 2235/616* (2013.01); *C04B 2235/666* (2013.01)

(58) Field of Classification Search
CPC ....... C04B 35/80; C04B 35/83; C04B 35/645; C04B 35/6455; C04B 2235/616; C04B 2235/604
See application file for complete search history.

(56) References Cited

U.S. PATENT DOCUMENTS 5,042,122 A * 8/1991 Iyer .......................... B05C 9/14
   28/282
5,984,055 A * 11/1999 Strasser .................. F16D 69/04
   188/258

(Continued)

FOREIGN PATENT DOCUMENTS

CN 104712691 6/2015
CN 108558422 9/2018

OTHER PUBLICATIONS

European Patent Office, European Search Report dated Jul. 3, 2020 in Application No. 19216236.0.

(Continued)

*Primary Examiner* — Timothy Kennedy
(74) *Attorney, Agent, or Firm* — Snell & Wilmer L.L.P.

(57) ABSTRACT

A method of fabricating a brake component made from a ceramic matrix composite is disclosed. In various embodiments, the method includes infiltrating a carbon fabric with a slurry containing a ceramic powder and a sintering aid; laying up the carbon fabric in a desired geometry to form a raw component; warm pressing the raw component to form a green component; and sintering the green component via a spark plasma sintering process to form a sintered component.

20 Claims, 6 Drawing Sheets

(51) Int. Cl.
*C04B 35/563* (2006.01)
*C04B 35/634* (2006.01)
*C04B 35/645* (2006.01)
*C04B 35/80* (2006.01)
*C04B 41/00* (2006.01)
*C04B 41/45* (2006.01)
*C04B 41/50* (2006.01)
*F16D 65/12* (2006.01)
*B64C 25/42* (2006.01)

(56) References Cited

U.S. PATENT DOCUMENTS

| | | | |
|---|---|---|---|
| 6,245,439 B1* | 6/2001 | Yamada | C22C 1/10 428/116 |
| 7,419,925 B1 | 9/2008 | Nunn | |
| 7,557,054 B2 | 7/2009 | Oda et al. | |
| 7,893,000 B2 | 2/2011 | Hirota et al. | |
| 9,988,313 B2 | 6/2018 | Miranzo et al. | |
| 10,151,362 B1 | 12/2018 | Bianco et al. | |
| 2002/0084558 A1* | 7/2002 | Hanzawa | C04B 35/573 266/236 |
| 2003/0044593 A1* | 3/2003 | Vaidyanathan | B29C 64/165 428/297.4 |
| 2014/0217332 A1* | 8/2014 | Simmons | B32B 17/04 264/105 |
| 2019/0062223 A1 | 2/2019 | Sciti et al. | |
| 2019/0168420 A1* | 6/2019 | Reese | C04B 35/638 |

OTHER PUBLICATIONS

J. Magnant et al "Fiber-reinforced ceramic matrix composites processed by a hybrid technique based on chemical vapor infiltration, slurry impregnation and spark plasma sintering", Journal of the European, Ceramic Society, vol. 33, No. 1, Jan. 1, 2013 (Jan. 1, 2013), pp. 181-190.

* cited by examiner

FABRICATION OF HIGH HEAT CAPACITY CERAMIC MATRIX COMPOSITE AIRCRAFT BRAKES USING SPARK PLASMA SINTERING

FIELD

The present disclosure relates generally to aircraft wheel and brake assemblies and, more particularly, to methods of fabricating brake components and heatsinks used in aircraft wheel and brake assemblies.

BACKGROUND

Aircraft typically utilize brake systems on wheels to slow or stop the aircraft during landings, taxiing and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

Carbon/carbon (C/C) composites and silicon carbide (SiC) based ceramic matrix composites (CMCs) have found use in the aerospace and other industries for fabricating brake stacks and heat sinks. These composites are typically produced using various methods, including, for example, chemical vapor infiltration (CVI), melt infiltration (MI), polymer impregnation and pyrolysis (PIP) and preceramic polymer densification (PPD). However, each of these methods of fabrication exhibit limitations. The processing times for both CVI and PIP, for example, can extend to well over one-hundred hours and CMCs fabricated using MI techniques tend to contain residual silicon, which limits upper use temperatures. Further, brake components fabricated using one or more of these methods often require inordinately high temperatures to achieve proper densification or fail to satisfy target thermal requirements (e.g., target high heat capacities). Thus, existing processes may exhibit long processing times or high processing temperatures, imprecise stoichiometric control or issues relating to achieving target thermal requirements for aerospace applications.

SUMMARY

A method of fabricating a brake component made from a ceramic matrix composite is disclosed. In various embodiments, the method includes infiltrating a carbon fabric with a slurry containing a ceramic powder and a sintering aid; laying up the carbon fabric in a desired geometry to form a raw component; warm pressing the raw component to form a green component; and sintering the green component via a spark plasma sintering process to form a sintered component.

In various embodiments, the sintering aid includes at least one of aluminum or boron. In various embodiments, the sintering aid may also include a boron compound, such as, for example, boride metals from Groups IVA to VIA of the periodic table. In various embodiments, the sintering aid includes an aluminum oxide. In various embodiments, the sintering aid includes the aluminum oxide and a yttrium oxide. In various embodiments, the sintering aid includes a weight percent of the aluminum oxide in a mixture of the aluminum oxide and the yttrium oxide ranging from about 14 percent to about 85 percent of the aluminum oxide. In various embodiments, the ceramic powder comprises at least one of boron carbide or silicon carbide.

In various embodiments, the method further includes machining the green component prior to sintering the green component. In various embodiments, the method further includes machining the sintered component to form the brake component.

In various embodiments, the spark plasma sintering process comprises applying a pressure to the green component that is equal to or less than 10,000 psi and, in various embodiments, equal to or less than 5,000 psi. In various embodiments, the spark plasma sintering process is performed at a temperature equal to or less than 1,950° C.

In various embodiments, the slurry comprises boron carbide and a weight percent of an aluminum oxide in a mixture of the aluminum oxide and a yttrium oxide ranging from about 14 percent to about 85 percent of the aluminum oxide and the slurry comprises between about 3 percent and about 15 percent by weight of the sintering aid.

In various embodiments, the brake component includes a volume of carbon fiber ranging from about 22 percent to about 45 percent and, in various embodiments, from about 28 percent to about 36 percent. In various embodiments, the brake component has a density ranging from about 2.3 gm/cm$^3$ to about 2.5 g/cm$^3$.

A method of fabricating a ceramic matrix composite component is disclosed. In various embodiments, the method includes: infiltrating a carbon fabric having an interface coating with a slurry containing a ceramic powder and a sintering aid; laying up the carbon fabric in a desired geometry to form a raw component; warm pressing the raw component to form a green component; and sintering the green component via a spark plasma sintering process to form a sintered component.

In various embodiments, the sintering aid includes a weight percent of a mixture of an aluminum oxide and a yttrium oxide ranging from about 14 percent to about 85 of the aluminum oxide and the slurry comprises between about 3 percent and about 15 percent by weight of the sintering aid. In various embodiments, the spark plasma sintering process is performed at a pressure that is equal to or less than 10,000 psi and, in various embodiments, equal to or less than 5,000 psi. In various embodiments, the spark plasma sintering process is performed at a temperature equal to or less than 1,950° C.

In various embodiments, the interface coating comprises a pyrolytic carbon or boron nitride applied by chemical vapor deposition to the carbon fabric, followed by a coating of SiC applied by chemical vapor deposition, and has a thickness from between about 0.3 microns and about 0.8 micron. In various embodiments, the sintering aid is configured to form a liquid phase during the spark plasma sintering process. In various embodiments, the ceramic matrix composite component includes a volume of carbon fiber ranging from about 22 percent to about 45 percent and, in various embodiments, from about 28 percent to about 36 percent and has a density ranging from about 2.3 gm/cm$^3$ to about 2.5 g/cm$^3$.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of elucidation and not of limitation. Furthermore, any reference to the singular includes plural embodiments, and any reference to more than one component or step may include a singular embodiment or step. Likewise, references to "a," "an" or "the" may include one item or more than one item and such reference to an item in the singular may also include the item in the plural. Also, any reference to attached, fixed, connected, or the like may include permanent, removable, temporary, partial, full or any other possible attachment option. Additionally, any reference to without contact (or similar phrases) may also include reduced contact or minimal contact. As used herein, "distal" refers to a direction outward, or generally away, from a reference component and "proximal" or "proximate" refer to a direction inward, or generally, towards the reference component. All ranges may include upper and lower values and all ranges and ratio limits disclosed herein may be combined. Further, the term "about" is intended to include a degree of error associated with measurement of a particular quantity based upon equipment or techniques otherwise available at the time of filing the application. For example, "about" may include a range of ±5% or 2% of a given value.

Figure 1A:
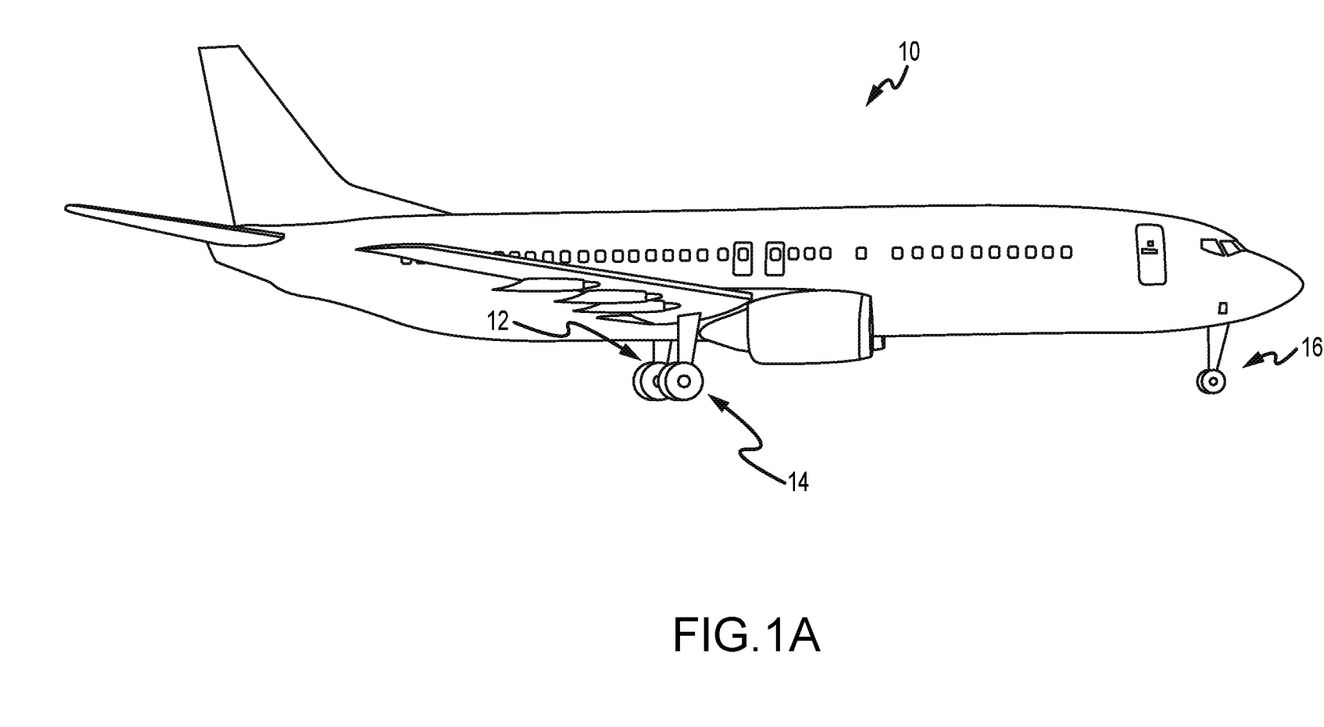
FIG. 1A illustrates an exemplary aircraft having a brake system, in accordance with various embodiments.
Figure 1B:
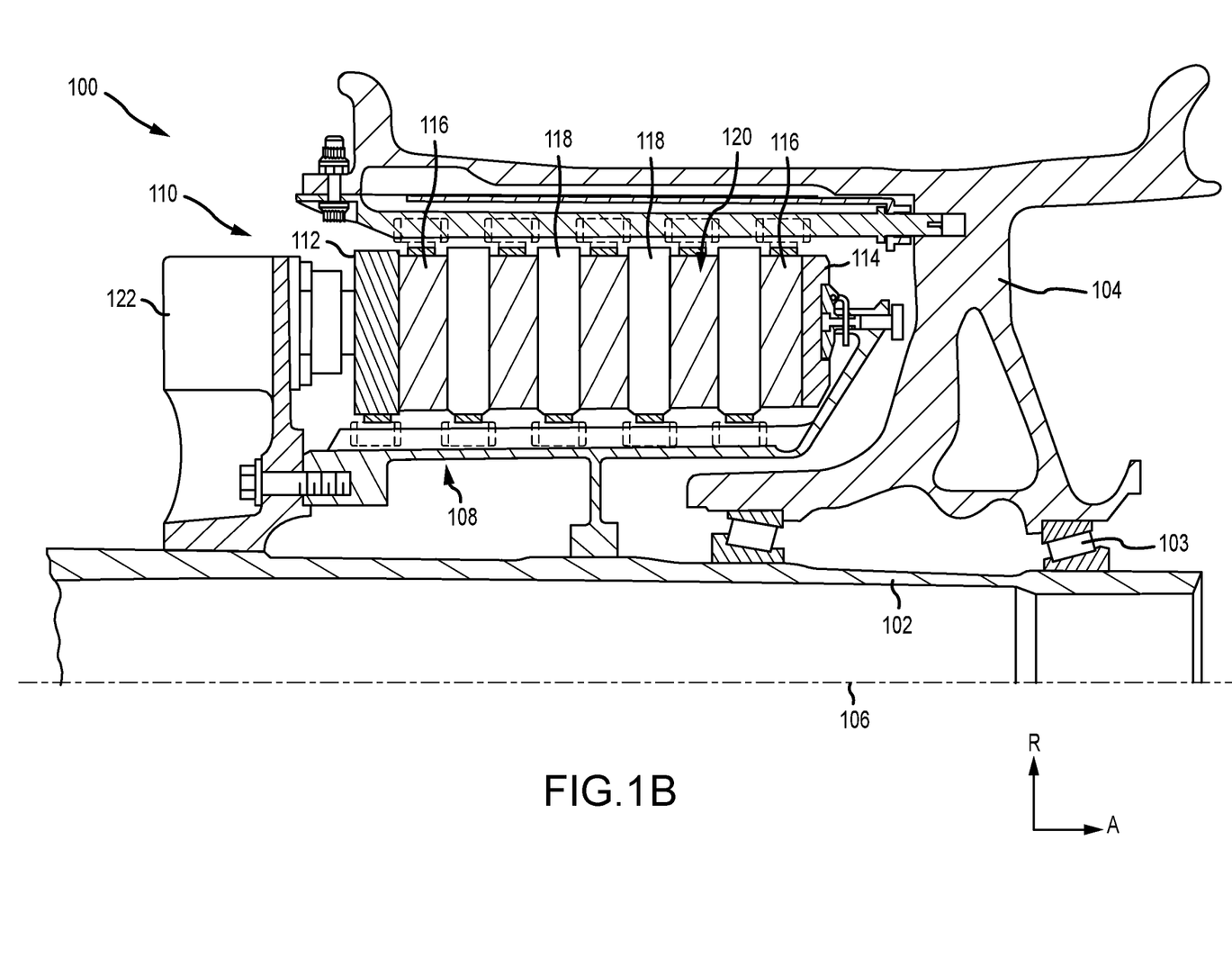
FIG. 1B illustrates a cross-sectional view of a brake assembly, in accordance with various embodiments.

Referring now to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just described, the disclosure nevertheless contemplates any number of landing gear configurations. Referring now to FIG. 1B, there is schematically depicted a brake mechanism 100 configured for use on a landing gear, such as, for example, each of the left main landing gear 12 and the right main landing gear 14 described above with reference to FIG. 1A. In various embodiments, the brake mechanism is mounted on an axle 102 for use with a wheel 104 disposed on and configured to rotate about the axle 102 via one or more bearing assemblies 103. A central axis 106 extends through the axle 102 and defines a center of rotation of the wheel 104. A torque plate barrel 108 (sometimes referred to as a torque tube or barrel or a torque plate) is aligned concentrically with the central axis 106, and the wheel 104 is rotatable relative to the torque plate barrel 108.

The brake mechanism 100 includes a piston assembly 110, a pressure plate 112 disposed adjacent the piston assembly 110, an end plate 114 positioned a distal location from the piston assembly 110, and a plurality of rotor disks 116 interleaved with a plurality of stator disks 118 positioned intermediate the pressure plate 112 and the end plate 114. The pressure plate 112, the plurality of rotor disks 116, the plurality of stator disks 118 and the end plate 114 together form a brake heat sink or brake stack 120. The pressure plate 112, the end plate 114 and the plurality of stator disks 118 are mounted to the torque plate barrel 108 and remain rotationally stationary relative to the axle 102. The plurality of rotor disks 116 is mounted to the wheel 104 and rotate with respect to each of the pressure plate 112, the end plate 114 and the plurality of stator disks 118.

An actuating mechanism for the brake mechanism 100 includes a plurality of piston assemblies, including the piston assembly 110, circumferentially spaced around a piston housing 122 (only one piston assembly is illustrated in FIG. 1B). Upon actuation, the plurality of piston assemblies affects a braking action by urging the pressure plate 112 and the plurality of stator disks 118 into frictional engagement with the plurality of rotor disks 116 and against the end plate 114. Through compression of the plurality of rotor disks 116 and the plurality of stator disks 118 between the pressure plate 112 and the end plate 114, the resulting frictional contact slows or stops or otherwise prevents rotation of the wheel 104. In various embodiments, the plurality of rotor disks 116 and the plurality of stator disks 118 are fabricated from various materials, such as, for example, ceramic matrix composite materials, that enable the brake disks to withstand and dissipate the heat generated during and following a braking action.

Figure 2:
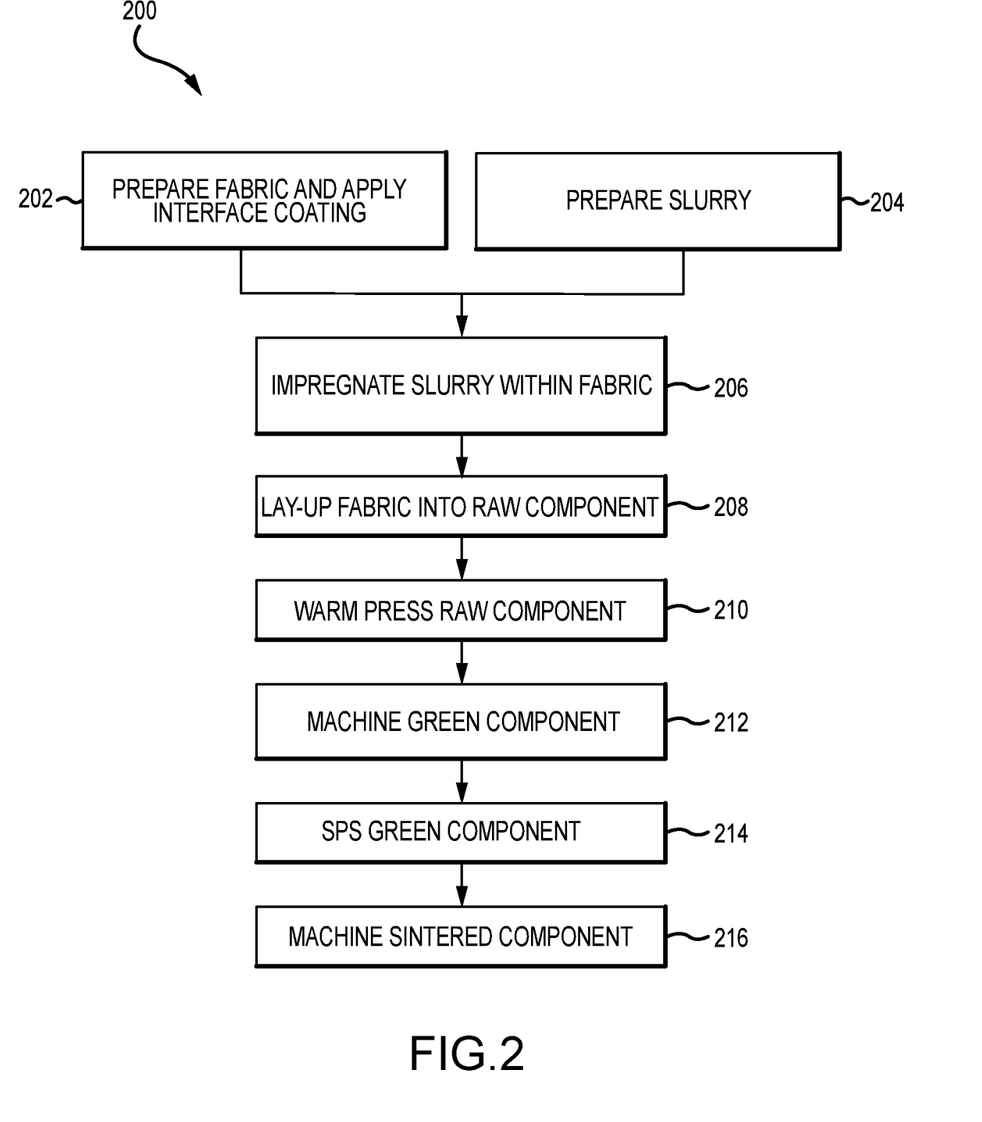
FIG. 2 illustrates a flowchart of method steps used in the fabrication of brake components, in accordance with various embodiments.

Referring now to FIG. 2, a flowchart 200 of method steps used in the fabrication of brake components is provided, in accordance with various embodiments. The brake components may comprise one or more of the plurality of rotor disks 116 and the plurality of stator disks 118 described above with reference to FIG. 1B, or to components thereof, such as, for example, wear liners attached to cores to form the disks. In a first step 202, a carbon fabric is prepared with 12K tow (e.g., a bundle of 12,000 individual carbon fiber filaments) or 24K tow. More broadly, in various embodiments, the carbon fabric may be prepared with tow ranging from 2K to 64K; in various embodiments, the carbon fabric may be prepared with tow ranging from 4K to 48K; in various embodiments, the carbon fabric may be prepared with tow ranging from 6K to 32K; and in various embodiments, the carbon fabric may be prepared with tow ranging from 12K to 24K. In various embodiments, larger tow (e.g., 36K or 48K tow or larger) may be employed to reduce cost. In various embodiments, the tow may be opened to facilitate or enhance the penetration of ceramic material between the fibers of the various tow. For example, in various embodiments, a carbonized tow may be manipulated with an air jet as described in U.S. Pat. No. 9,758,908, assigned to Goodrich Corp., the entirety of which is hereby incorporated by reference, to open up the tow or to mechanically spread the tow into a manipulated tow having a desired fiber volume. In various embodiments, the carbon fabric may be prepared as a continuous net shape helical or spirally wound fabric. In various embodiments, the carbon fabric may be cut from rolls of fabric prepared through weaving or through fiber lay-up and placement, such as, for example, cross-lapping of multiple layers of tow. In various embodiments, the tow are held in place through needling or stitching, such as, for example, Z-needling. Further, in various embodiments, the fabric may be prepared from polyacrylonitrile (PAN) fibers or from continuous oxidized polyacrylonitrile (PAN) fibers (OPF fibers) and subsequently carbonized. In various embodiments, to provide a weak interface between the fibers and a ceramic matrix composite material and to enhance fracture toughness, a fiber matrix interface coating is applied onto the surface of the carbon fibers. For example, in various embodiments, a thin coating of pyrolytic carbon or boron nitride (BN) is applied by chemical vapor deposition to the carbon fabric, where the thickness of the coating may vary from between about 0.3 microns and about 0.8 microns. In various embodiments, the thin coating of pyrolytic carbon or boron nitride is followed by a coating of SiC applied by chemical vapor deposition.

In a second step 204, a slurry containing boron carbide ($B_4C$) powder, one or more sintering aids (discussed below), a binder (e.g., a polymeric adhesive or polyvinyl acetate), and a dispersing and wetting agent is prepared. In various embodiments, the grain size of the boron carbide powder and the sintering aids is selected to be less than about 1.5 microns to facilitate penetration within the carbon fabric and to lower the temperature applied to a green component during a subsequent sintering step. In various embodiments, the loading of the solids within the carbon fabric is as high as possible to achieve a green body (or a green component) with a high density to minimize movement of the boron carbide powder and the fibers during a de-bulking step and the subsequent sintering step.

In a third step 206, the slurry is infiltrated into the carbon fabric. In various embodiments, the amount of slurry infiltrated is regulated to achieve a targeted composite fiber volume. In a fourth step 208, the infiltrated layers of carbon fabric are laid-up in a desired geometry or component shape (e.g., an annular disk) to form a raw component having a desired fiber orientation. In a fifth step 210, the resulting fabric layup or raw component is warm pressed to form a green component having the desired geometry. In a sixth step 212, the green component is machined to eliminate extraneous areas of the green component and to form a component geometry having dimensions more closely aligned with the final brake component. In a seventh step 214, the green component is placed into a die (e.g., a graphite die) of a spark plasma sintering (SPS) device, which may share componentry and operational characteristics of the field assisted sintering device described in U.S. Pat. No. 10,151,362, assigned to Goodrich Corp., the entirety of which is incorporated herein by reference, for application of heat and pressure. Following a de-binding step, heat and pressure are raised in a seventh step 214 to carry out a spark plasma sintering (SPS) process and to form a sintered component. In various embodiments, the SPS device may be operated in a batch or a continuous process configuration. In the continuous process configuration, the part fabrication rate may be accelerated by moving the part being sintered through cooling chambers connected downstream to the SPS device. Following the spark plasma sintering process, the sintered component may be machined into a final component (e.g., a final brake component) in an eighth step 216.

Figure 3:
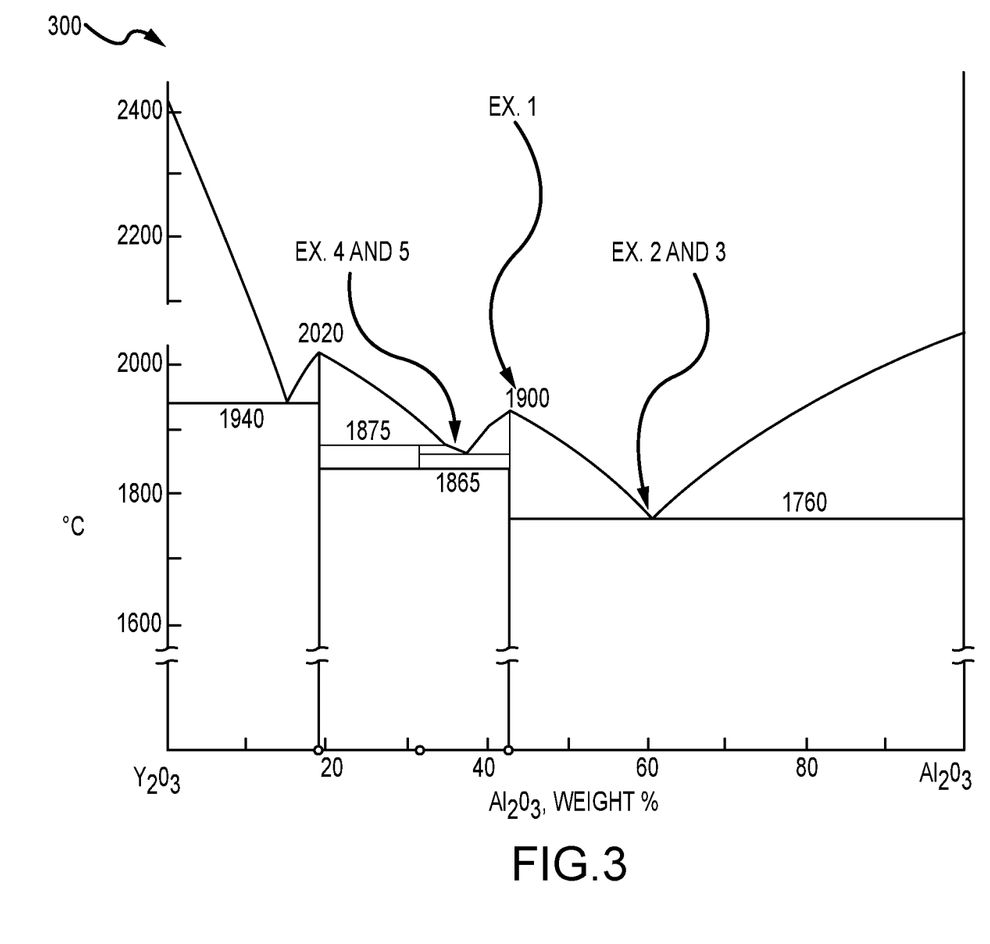
FIG. 3 illustrates a $Al_2O_3$—$Y_2O_3$ phase diagram used in the fabrication of brake components, in accordance with various embodiments.

Referring now to FIG. 3, various sintering aids used in the SPS process are described, with reference to an $Al_2O_3$—$Y_2O_3$ phase diagram 300. In various embodiments, the sintering aids incorporated into the slurry are configured to form a liquid phase during the SPS process, which is desirable to facilitate particle rearrangement under the mechanical load applied to the green component (e.g., during the seventh step 214 described above with reference to FIG. 2). Several candidates of sintering aids are contemplated in this disclosure, such as, for example, $Al_2O_3$—$Y_2O_3$ (see FIG. 3); AlN—$Y_2O_3$ and BN—$Y_2O_3$, each of which may be used to enable the SPS process being carried out at lower temperatures relative to other techniques, such as, for example, the sintering techniques described in U.S. Pat. No. 10,151,362. As described in more detail below, in various embodiments, compositions of the $Al_2O_3$—$Y_2O_3$ phase diagram 300 enable the SPS process to be successfully performed at melting temperatures below about 1950° C., with the resulting component exhibiting higher heat capacities than comparable carbon/carbon components. These compositions correspond to ratios of $Al_2O_3/Y_2O_3$ between about 0.17 (≈14% $Al_2O_3$) and about 5.7 (≈85% $Al_2O_3$), excluding compositions where the melting point exceeds about 1950 C. In various embodiments, the sintering aid may also include a boron compound, such as, for example, one or more boride metals from Groups IVA to VIA of the periodic table.

In various embodiments, the amount of the sintering aids may be adjusted from about 3% to about 15% (weight percent) of the slurry. The use of sintering aids having small grain size (e.g., on the order of 1.5 microns or less) serves to better distribute the sintering aids within the carbon fabric, thereby improving the effectiveness of the sintering aids. The sintering aids described herein also serve to reduce the die pressures (e.g., on the order of 5,000 psi (≈3.44E4 kPa) or less) needed to reach desirable densifications and to avoid additional costs associated with tooling capable of operating at pressures greater than 5,000 psi (≈3.44E4 kPa). In various embodiments, the spark plasma sintering process is performed at a pressure that is equal to or less than 10,000 psi (≈6.88E4 kPa) and, in various embodiments, the spark plasma sintering process is performed at a pressure that is equal to or less than 5,000 psi (≈3.44E4 kPa). In various embodiments, the addition of materials like silicon carbide (SiC) to the slurry is also beneficial, as doing so increases the thermal conductivity and enhances the thermal shock resistance of the component following the SPS process. This may be accomplished, for example, by adding fine grains of SiC (e.g., grains having a characteristic size less than 1.5 microns) to the slurry prior to performing the SPS process. The SiC may be added, for example, at levels up to 15% (by volume) of the slurry. In various embodiments, diamond powder may be added to the $B_4C$ to raise the thermal conductivity and enhance the thermal shock resistance. In various embodiments, the binder may comprise polyvinyl acetate (PVA) or any water soluble resins or aqueous binder emulsions that leave low carbon residue upon heat treatment. The following description provides several examples of the foregoing, in accordance with various embodiments. As described further below, in various embodiments, the brake component fabricated using this disclosure includes a volume of carbon fiber ranging from about 22 percent to about 45 percent and, in various embodiments, from about 28 percent to about 36 percent. In addition, in various embodiments, the brake component has a density ranging from about 2.3 gm/cm$^3$ to about 2.5 g/cm$^3$.

Example 1

An aqueous slurry is prepared with $B_4C$ having a grain size of 1.5 microns or less, a yttria-based sintering aid of 8%

Figure 4A:
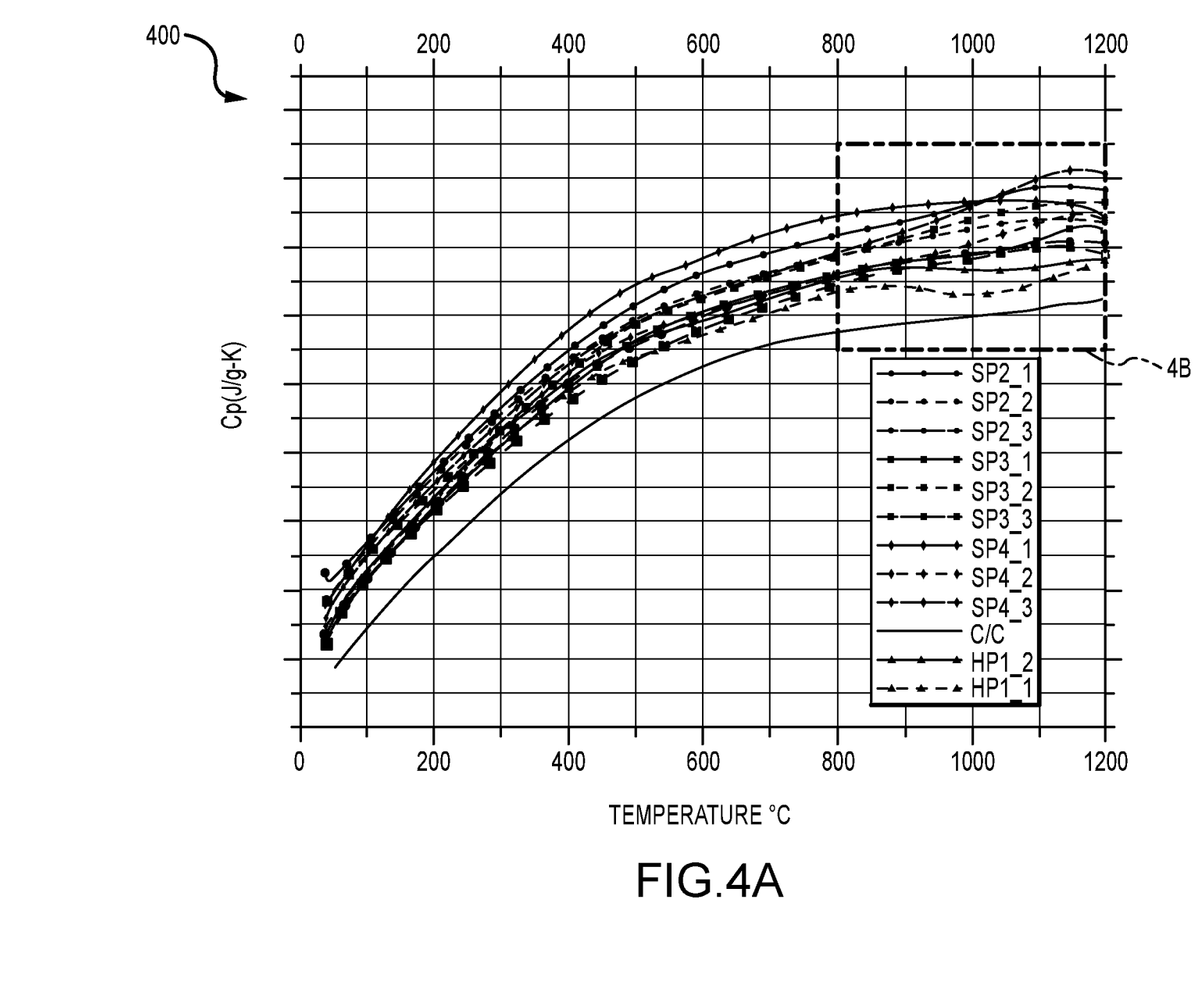
FIGS. 4A and 4B illustrate results of heat capacity versus temperature of fabricated components, in accordance with various embodiments.
Figure 4B:
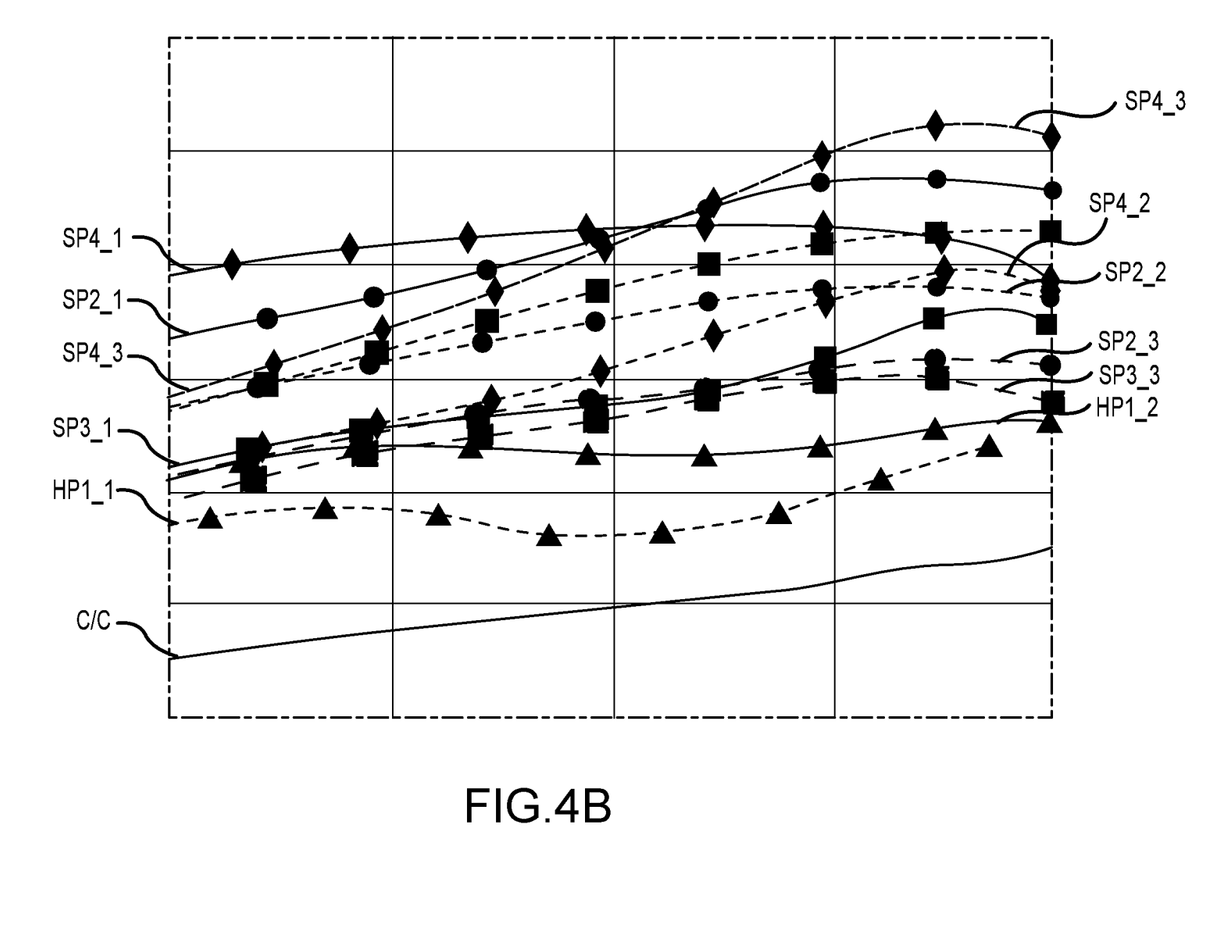

(by weight) and a binder comprising PVA. The source of the yttria is an aqueous nanosized suspension with alumina grains finer than 0.6 microns. The $Al_2O_3/Y_2O_3$ ratio is 0.75 (≈42.8% $Al_2O_3$). A pyrolytic carbon coated fabric is impregnated with the slurry, molded into a green composite and subjected to sintering via an SPS process at 1850° C. for 15 minutes. The resulting CMC component exhibits a density of 2.38 g/cm$^3$ with less than 5% open porosity. The CMC component also exhibits a 28% fiber volume. The heat capacity of the CMC component is illustrated in FIGS. 4A and 4B (cases HP1_1 and HP1_2) and exceeds the heat capacity of a baseline carbon/carbon component over the indicated temperature range.

Example 2

An aqueous slurry is prepared with $B_4C$ having a grain size of 1.5 microns or less, a yttria-based sintering aid of 8% (by weight) and a binder comprising PVA. The source of yttria is an aqueous nanosized suspension with alumina grains finer than 0.6 microns. The $Al_2O_3/Y_2O_3$ ratio is 1.5 (≈60% $Al_2O_3$). A green component is molded and sintered via an SPS process at 1770° C. for 25 minutes. The resulting CMC component exhibits a density of 2.42 g/cm$^3$ with 1.4% open porosity and a fiber volume of 28%. The heat capacity of the CMC component is illustrated in FIGS. 4A and 4B (cases SP2_1, SP2_2 and SP2_3) and exceeds the heat capacity of a baseline carbon/carbon component over the indicated temperature range.

Example 2

An aqueous slurry is prepared with $B_4C$ having a grain size of 1.5 microns or less, a yttria-based sintering aid of 8% (by weight) and a binder comprising PVA. The source of yttria is an aqueous nanosized suspension with alumina grains finer than 0.6 microns. The $Al_2O_3/Y_2O_3$ ratio is 1.5 (≈60% $Al_2O_3$). A green component is molded and sintered via an SPS process at 1770° C. for 15 minutes. The resulting CMC component exhibits a density of 2.34 g/cm$^3$ with 3.7% open porosity and a fiber volume of 31%. The heat capacity of the CMC component is illustrated in FIGS. 4A and 4B (cases SP3_1, SP3_2 and SP3_3) and exceeds the heat capacity of a baseline carbon/carbon component over the indicated temperature range.

Example 4

An aqueous slurry is prepared with $B_4C$ having a grain size of 1.5 microns or less, a yttria-based sintering aid of 8% (by weight) and a binder comprising PVA. The source of yttria is an aqueous nanosized suspension with alumina grains finer than 0.6 microns. The $Al_2O_3/Y_2O_3$ ratio is 0.587 (≈36.9% $Al_2O_3$). A green component is molded and sintered via an SPS process at 1800° C. for 25 minutes. The resulting CMC component exhibits a density of 2.42 g/cm$^3$ with 0.9% open porosity and a fiber volume of 36%. The heat capacity of the CMC component is illustrated in FIGS. 4A and 4B (cases SP4_1, SP4_2 and SP4_3) and exceeds the heat capacity of a baseline carbon/carbon component over the indicated temperature range.

Example 5

An aqueous slurry is prepared with $B_4C$ having a grain size of 1.5 microns or less, a yttria-based sintering aid of 8% (by weight), 10% (by weight) of SiC at submicron size, and a binder comprising PVA. The source of yttria is an aqueous nanosized suspension with alumina grains finer than 0.6 microns. The $Al_2O_3/Y_2O_3$ ratio is 0.587 (≈60% $Al_2O_3$). A green component is molded and sintered via an SPS process at 1820° C. for 25 minutes. The resulting CMC component exhibits a density of 2.38 g/cm$^3$ and a fiber volume of 30%. The heat capacity of the CMC component is illustrated in FIGS. 4A and 4B (cases SP4_1, SP4_2 and SP4_3) and exceeds the heat capacity of a baseline carbon/carbon component over the indicated temperature range.

Referring now to FIGS. 4A and 4B a graph 400 illustrates the results of heat capacity as a function of temperature for the CMC components fabricated in Examples 1, 2, 3 and 4 above (FIG. 4B is a blow-up of the graph 400 as illustrated in FIG. 4A). For example, and with reference to Example 1, results of heat capacity for two components (HP1_1 and HP1_2) fabricated as described are plotted against temperature. The results are also plotted against the heat capacity exhibited by a baseline carbon/carbon component. Each component from Example 1 indicates a higher heat capacity than the baseline carbon/carbon component throughout the range of temperature from approximately 50° C. to 1,200° C. Similarly, for each of Examples 2, 3 and 4, results of heat capacity for three components fabricated as described are plotted against temperature. Each component from Examples 2, 3 and 4 also indicate a higher heat capacity than the baseline carbon/carbon component throughout the range of temperature from approximately 50° C. to 1,200° C.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A method of fabricating a brake component made from a ceramic matrix composite, comprising:
   infiltrating a carbon fabric with a slurry containing a ceramic powder and a sintering aid, the carbon fabric having an opened tow ranging from about 12,000 to about 24,000 bundles of individual carbon fiber filaments, wherein the ceramic powder comprises a boron carbide;
   laying up the carbon fabric in a desired geometry to form a raw component;
   pressing the raw component to form a green component; and
   sintering the green component via a spark plasma sintering process to form a sintered component.

2. The method of claim 1, wherein the sintering aid includes at least one of aluminum, boron, or a boride compound.

3. The method of claim 1, wherein the sintering aid includes an aluminum oxide.

4. The method of claim 3, wherein the sintering aid includes the aluminum oxide and a yttrium oxide.

5. The method of claim 4, wherein the sintering aid includes a weight percent of a mixture of the aluminum oxide and the yttrium oxide ranging from about 14 wt percent to about 85 wt percent of the aluminum oxide and wherein the slurry comprises between about 3 wt percent and about 15 wt percent of the sintering aid.

6. The method of claim 5, wherein the ceramic powder comprises silicon carbide.

7. The method of claim 1, further comprising machining the green component prior to sintering the green component.

8. The method of claim 7, further comprising machining the sintered component to form the brake component.

9. The method of claim 1, wherein the spark plasma sintering process comprises applying a pressure to the green component that is equal to or less than 68947 kPa.

10. The method of claim 9, wherein the spark plasma sintering process is performed at a temperature equal to or less than 1,950° C.

11. The method of claim 10, wherein the slurry comprises boron carbide and the sintering aid comprises a weight percent of a mixture of an aluminum oxide and a yttrium oxide ranging from about 14 wt percent and about 85 wt percent of the aluminum oxide and wherein the slurry comprises between about 3 wt percent and about 15 wt percent of the sintering aid.

12. The method of claim 11, wherein the brake component includes a volume of carbon fiber ranging from about 22 vol percent to about 45 vol percent.

13. The method of claim 12, wherein the brake component has a density ranging from about 2.3 gm/cm$^3$ to about 2.5 g/cm$^3$.

14. A method of fabricating a ceramic matrix composite component, comprising:
   infiltrating a carbon fabric having an interface coating with a slurry containing a ceramic powder and a sintering aid, the carbon fabric having an opened tow ranging from about 12,000 to about 36,000 bundles of individual carbon fiber filaments;
   laying up the carbon fabric in a desired geometry to form a raw component;
   pressing the raw component to form a green component; and
   sintering the green component via a spark plasma sintering process to form a sintered component,
   wherein the fabricated ceramic matrix composite component comprises a density with less than 5% open porosity.

15. The method of claim 14, wherein the sintering aid includes a weight percent of a mixture of an aluminum oxide and a yttrium oxide ranging from about 14 percent to about 85 percent of the aluminum oxide and wherein the sintering aid comprises between about 3 percent and about 15 percent by weight of the slurry.

16. The method of claim 15, wherein the spark plasma sintering process is performed at a pressure that is equal to or less than 68947 kPa.

17. The method of claim 16, wherein the spark plasma sintering process is performed at a temperature equal to or less than 1,950° C.

18. The method of claim 17, wherein the interface coating comprises a pyrolytic carbon or boron nitride applied by chemical vapor deposition to the carbon fabric, has a thickness from between about 0.3 microns and about 0.8 micron, and is followed by a coating of SiC applied by chemical vapor deposition.

19. The method of claim 17, wherein the sintering aid is configured to form a liquid phase during the spark plasma sintering process.

20. The method of claim 17, wherein brake component includes a volume of carbon fiber ranging from about 28 percent to about 36 percent and has a density ranging from about 2.3 gm/cm$^3$ to about 2.5 g/cm$^3$.

* * * * *